May 13, 1952            L. CRISTIANI            2,596,129
DEVICE FOR FOUR-COLOR STEREOSCOPIC CINEMATOGRAPHY
BASED ON ADDITIONAL SYNTHESIS
Filed Oct. 12, 1949
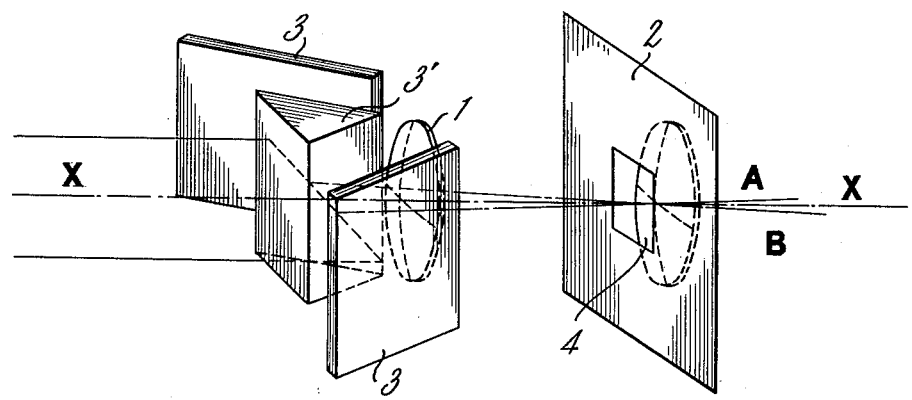
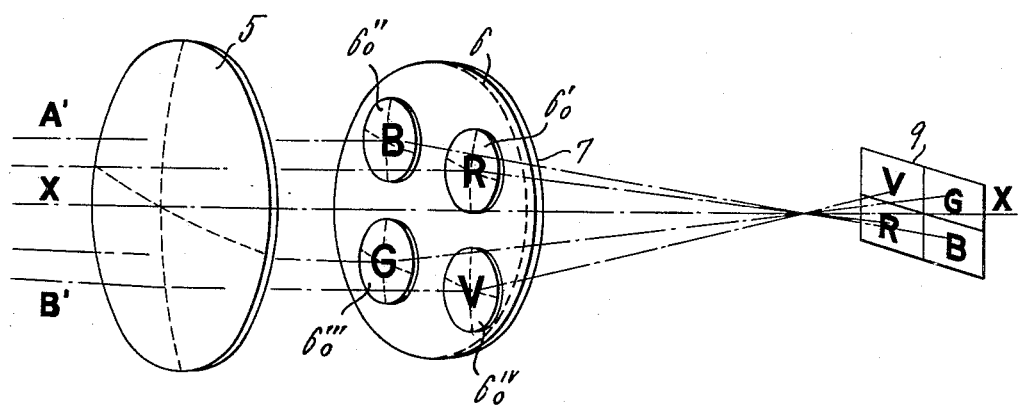
INVENTOR.
LUIGI CRISTIANI
BY Patented May 13, 1952

2,596,129

UNITED STATES PATENT OFFICE 2,596,129

DEVICE FOR FOUR-COLOR STEREOSCOPIC CINEMATOGRAPHY BASED ON ADDITIONAL SYNTHESIS

Luigi Cristiani, Florence, Italy

Application October 12, 1949, Serial No. 120,938
In Italy October 16, 1948

1 Claim. (Cl. 88—16.6)

The present invention refers to a device for four color stereoscopic cinematography based on additional synthesis of the type described in the applicant's patent application Ser. No. 768,210, now matured into U. S. Letters Patent No. 2,533,719; comprising a forward objective, a double pair of mirrors immediately disposed before said forward objective and spaced so as to provide a stereoscopic basis, a window, a field lens for collecting pencils coming from said forward objective, an intermediate objective to which said pencils are conveyed, the focus of said field lens and said intermediate objective being positioned in said window, whereby rays of light coming from said intermediate objective form parallel pencils, a pyramidical prism provided with four faces and having the vertex disposed to coincide with the optical axis, two of said prismatic faces displacing light rays coming from the right image, the other two faces displacing light rays coming from the left image, filter means adjacent said pyramidical prism and covering each a single prismatic face, and a rear objective placed rearwardly of said filter means for projecting the pairs of images adjacent each other onto a surface.

The forward objective forms the stereoscopic image on a field diaphragm disposed in the focal plane, so that the images of objects at infinite distance are superposed at said field diaphragm.

The filter means are so disposed that the right images are selected according to a pair of complemental colors, and the left images are similarly selected according to a pair of complemental colors.

The device as characterized in the aforesaid patent is rather too voluminous in length while it has been ascertained that it is possible to obtain the same effect and remove said inconvenience by changing the system which comprises the pyramidical deviating prism with four faces and the rear objective forming four images of the subject on a film, arranged one near the other, to a system substantially formed by four identical objectives disposed on the same plane with optical axis parallel and so spaced that two objectives are crossed by the light pencils coming from the right image and two by the light pencils coming from the left image.

The annexed drawing shows diagrammatically the thus modified device, drawn for comparsion with the schematic drawing of the aforesaid patent, in which, according to the improved invention, the objective between the prism and the plane of the film is eliminated, the whole complex being thus considerably shortened and simplified.

Parts that are equal in both systems are referred to with identical numerals, while corresponding parts are referred to with identical numerals and the numeral 0.

As it can be seen in the annexed drawing, in the plane 6, downstream with respect to the system of lenses 4 and 5 in which the image of the edge separating the pairs of mirrors 3 is formed, are placed four identical objectives $6_0^I$, $6_0^{II}$, $6_0^{III}$ and $6_0^{IV}$, said objectives having optical axis parallel and so displaced that two objectives are crossed by the light pencils coming from the right image and two by the light pencils coming from the left image.

Said objectives can be constructively delimitated so as to completely utilize the pencils which cross the plane 6, the displacement between their optical axes and the focal distances being so chosen that on the screen four images arranged one near the other are formed, so that the group of the four images covers the normal cinematograpic size.

In the same way as it is shown in the device as in the aforesaid patent, the four filters 7, which are disposed for projection on the opposite side of the objectives will cover each one objective.

The taking and projection of the images occur as described in the aforesaid patent, and their description is therefore omitted in the present disclosure.

Having thus described the invention, what is claimed as new and desired to be secured by Letters Patent, is:

An optical device for stereoscopic color cinematography comprising a forward objective, a double pair of mirrors immediately disposed before said forward objective and spaced so as to provide a stereoscopic basis, a window, a field lens for collecting pencils comings from said forward objective, an intermediate objective to which said pencils are conveyed, the focus of said field lens and said intermediate objective being positioned in said window, whereby rays of light coming from said intermediate objective form parallel pencils, a group of four identical dividing objectives disposed in the same plane and having their optical axes parallel and at equal distances from the axis of the optical device, two of said dividing objectives displacing light rays coming from the right image and the other two objectives displacing light rays coming from the left image, and filter means adjacent said four dividing objectives and extending substantially to the entire wall area thereof, through which said dividing objectives project the pairs of images adjacent each other onto a surface.

LUIGI CRISTIANI.

REFERENCES CITED

The following references are of record in the file of this patent:

UNITED STATES PATENTS

| Number | Name | Date |
|---|---|---|
| 1,629,974 | Russo | May 24, 1927 |
| 1,843,663 | Cregier | Feb. 2, 1932 |
| 2,017,190 | Waide | Oct. 15, 1935 |
| 2,096,665 | Audibert | Oct. 19, 1937 |